US009829167B2

(12) United States Patent
Berthold et al.

(10) Patent No.: US 9,829,167 B2
(45) Date of Patent: Nov. 28, 2017

(54) LIGHTING APPARATUS FOR VEHICLES

(71) Applicant: Hella KGaA Hueck & Co., Lippstadt (DE)

(72) Inventors: Hans-Gerd Berthold, Paderborn (DE); Marc Kaup, Paderborn (DE); Franziska Kley, Geseke (DE); Dirk Kliebisch, Paderborn (DE)

(73) Assignee: Hella KGaA Hueck & Co., Lippstadt (DE)

( * ) Notice: Subject to any disclaimer, the term of this patent is extended or adjusted under 35 U.S.C. 154(b) by 185 days.

(21) Appl. No.: 14/868,583

(22) Filed: Sep. 29, 2015

(65) Prior Publication Data

US 2016/0146432 A1 May 26, 2016

(30) Foreign Application Priority Data

Nov. 26, 2014 (DE) ........................ 10 2014 117 314

(51) Int. Cl.

*F21V 7/04* (2006.01)
*F21V 7/06* (2006.01)
*B60Q 1/04* (2006.01)
*F21S 8/10* (2006.01)

(52) U.S. Cl.

CPC ......... *F21S 48/137* (2013.01); *F21S 48/1154* (2013.01); *F21S 48/1258* (2013.01); *F21S 48/1317* (2013.01); *F21S 48/1747* (2013.01)

(58) Field of Classification Search

CPC ..... F21S 48/13–48/1394; F21V 7/0066; F21V 7/0083; F21V 7/10; F21V 7/0025

See application file for complete search history.

(56) References Cited

U.S. PATENT DOCUMENTS

| | | | | |
|---|---|---|---|---|
| 6,474,852 B1 * | 11/2002 | Ohkohdo | B60Q 1/2696 | 362/237 |
| 6,805,476 B2 * | 10/2004 | Amano | B60Q 1/2696 | 362/245 |
| 6,814,475 B2 * | 11/2004 | Amano | F21S 48/215 | 362/240 |
| 2003/0169599 A1 * | 9/2003 | Natsume | B60Q 1/2696 | 362/543 |
| 2006/0256574 A1 * | 11/2006 | Moore | A01K 27/006 | 362/555 |
| 2013/0155712 A1 * | 6/2013 | Kloos | F21S 48/1154 | 362/521 |

FOREIGN PATENT DOCUMENTS

| | | | |
|---|---|---|---|
| AT | EP 1561994 A2 * | 8/2005 | F21V 7/0058 |
| DE | 10 2008 013 603 | 9/2009 | |
| DE | 102010007774 A1 * | 8/2011 | F21V 7/048 |
| DE | 10 2011 054 230 | 4/2013 | |
| DE | 10 2011 054 234 | 4/2013 | |
| DE | 10 2011 054 235 | 4/2013 | |

* cited by examiner

*Primary Examiner* — Mariceli Santiago
(74) *Attorney, Agent, or Firm* — Husch Blackwell LLP

(57) ABSTRACT

A lighting apparatus for vehicles with a plurality of light sources and with a defined light distribution. The optical unit has an upstream optical unit with upstream optical elements allocated to the respective light sources, which are immediately adjacent to the light sources in the primary emission direction upstream of same. The majority of upstream optical elements have a segmented embodiment and is connected by joining.

9 Claims, 3 Drawing Sheets

LIGHTING APPARATUS FOR VEHICLES

CROSS REFERENCE

This application claims priority to German Application No. 10 2014 117314.7, filed Nov. 26, 2014, which is hereby incorporated by reference.

FIELD OF TECHNOLOGY

The invention pertains to lighting apparatus for vehicles with a number of light sources and with an optical unit for generating a predefined light distribution, wherein the optical unit has an upstream optical unit with respective upstream optical units allocated to the respective light sources, which are immediately adjacent to the same in the primary direction of emission.

BACKGROUND

DE 10 2011 054 230 A1 discloses lighting apparatus for vehicles with a plurality of light sources arranged in a matrix and an optical unit allocated to the same for generating a specified light distribution. To make the light distribution uniform, the optical unit has an upstream optical unit that is immediately adjacent in the emission direction of the light sources. The upstream optical unit has a plurality of upstream optical units, each configured as flat strip elements and all arranged relative to each other in the form of a grid. For this purpose, each of the strip elements has slots allowing them to be inserted into each other crosswise creating checkerboard-like openings which are arranged flush with the light sources. The light emitted by the light sources is reflected multiple times on the flat sides of the strip elements and thus preformed. A disadvantage of the strip grid formed by the strip elements is that due to their flat arrangement, the configuration to calculate the light distribution is limited. The degree of reflection of the strip elements is also limited.

SUMMARY OF THE INVENTION

Therefore, the present invention is intended as an advanced embodiment of lighting apparatus for vehicles with a plurality of light sources and an optical unit such that the effectiveness and variability are increased while making the light distribution more uniform.

To solve this task, a feature of the invention is the modular configuration of the upstream optical unit, wherein the plurality of upstream optical units is in segmented form and connected to each other by joining.

The invention provides for a modular upstream optical unit that has segmented upstream optical elements. This enables the configuration of upstream optical units to be adapted to different light distributions. An advantage of the segmented upstream optical unit is its ability to be used for a variety of defined light distributions. In particular, this allows a specified light distribution to be scalable. Furthermore, by replacing upstream optical elements, a targeted local change of the light distribution can be attained. For example, the upstream optical unit can be changed by addition or reduction or by using individual upstream optical elements and can be adapted to the requirements of the defined light function. Preferably, the upstream optical elements are joined to each other such that they can be detached, allowing later adaptation of the upstream optical unit to a changed light distribution.

The modular configuration of the upstream optical unit enables a wide variety of light distribution settings due to the optional variation of the number of upstream optical elements. Thus the horizontal width of the light distribution depends on the number of joined upstream optical elements.

In a preferred iteration of the invention, the upstream optical unit has a plurality of identical upstream optical elements and/or a plurality of different upstream optical elements. The form of light distribution can be varied locally by providing different upstream optical elements. Thus it is easy to implement a customizable standard module from upstream optical units. The different standard modules (upstream optical units) thus formed comply with all legal requirements with regard to the specified light distribution, but differ in terms of the illuminance in different areas of the light distribution.

In a preferred iteration of the invention, the upstream optical elements are joined in a detachable manner so that later, i.e. after the upstream optical unit is manufactured, the length and/or dimension of same can be modified easily, for example to change the shape and/or the width of the light distribution.

In an advanced iteration of the invention, the upstream optical elements each have at least one curved reflector segment, enabling the required light values to be generated more efficiently in the light distribution system.

In an advanced embodiment of the invention, the upstream optical elements each have an upper reflector segment and a lower reflector segment. Furthermore, adjacent upstream optical elements can be divided by separator strip elements. The separator strip elements make it possible to delineate light distribution segments generated by adjacent upstream optical elements in conjunction with a primary optical unit arranged in the primary emission direction. An advantage is that the light distribution is thus composed of light distribution segments—provided by the upstream optical elements and mapped by the primary optical unit—that are immediately adjacent, without any dark gaps in between.

In an advanced embodiment of the invention, the separator strip elements preferably extend level and perpendicular to a light source plane. The separator strip elements extend from the light source plane to an area of a front side of the reflector segments, ensuring complete separation between the upstream optical elements in terms of lighting technology.

In an advanced embodiment of the invention, the separator strip elements are configured as reflective sheet metal parts so that they can contribute to light distribution by reflecting a light segment bundle emitted by an allocated light source through reflection.

In an advanced embodiment of the invention, the upstream optical elements are arranged into single or multiple rows. This enables light distribution with greater luminous intensity when the upstream optical unit is arranged in multiple rows.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
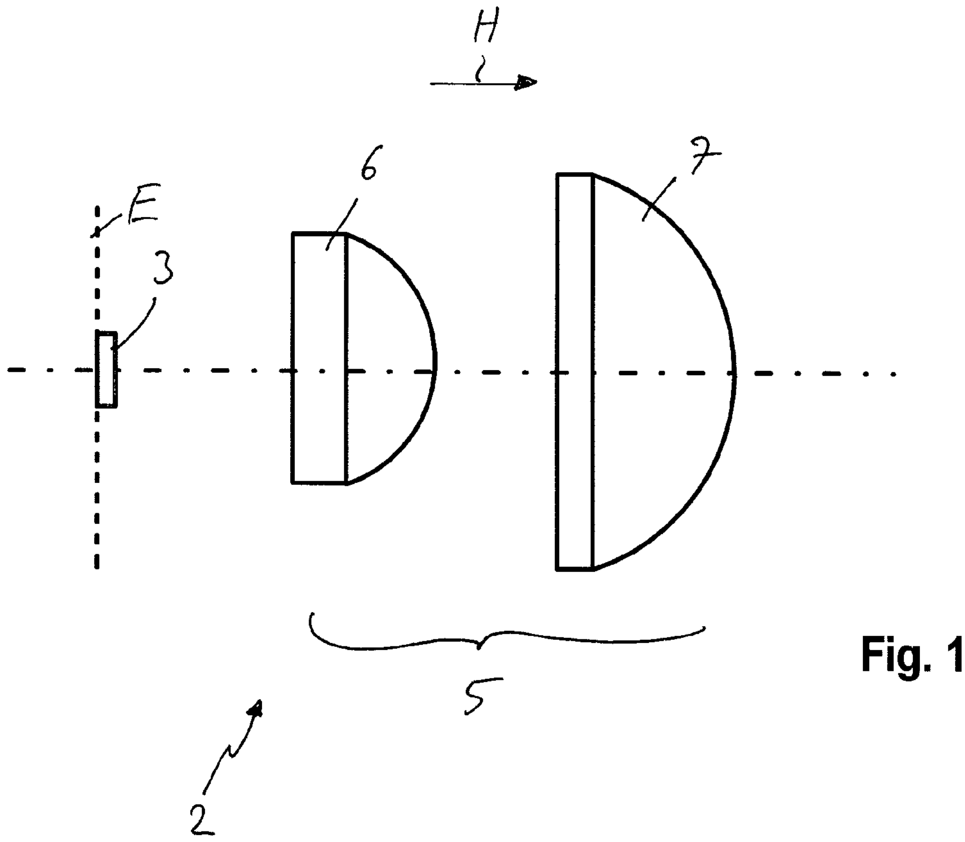
FIG. 1 is a schematic side view of the lighting apparatus.

A lighting apparatus for vehicles in accordance with the invention is preferably used in a headlamp to create a glare-free high beam function as a light distribution system. To prevent unwanted glare for traffic objects within close range of the headlights, the specific light area of the light distribution system in which the traffic object is located is disabled by shutting off corresponding light sources.

The lighting apparatus has a number of light sources 1 to which an optical unit 2 is allocated to generate a defined light distribution. The optical unit 2 consists in part of an upstream optical unit 3, which is arranged in the primary emission direction H upstream of the light sources 1. The light sources 1 are arranged in a light source level E.

The upstream optical unit 3 consists of a number of upstream optical elements 4 that matches the number of light sources 1, which are connected by joining. Thus the upstream optical unit 3 has a modular configuration and has segmented upstream optical elements 4.

The upstream optical elements 4 are each assigned to a single light source 1 and are flush with the same in the primary emission direction H upstream of the respective light sources 1. In the primary emission direction H upstream of the upstream optical unit 3, a primary optical unit 5 is arranged consisting of a first lens 6 and a second lens 7 in the present example embodiment. Alternatively, the primary optical unit 5 can also consist of a single lens or a lens system.

Figure 2:
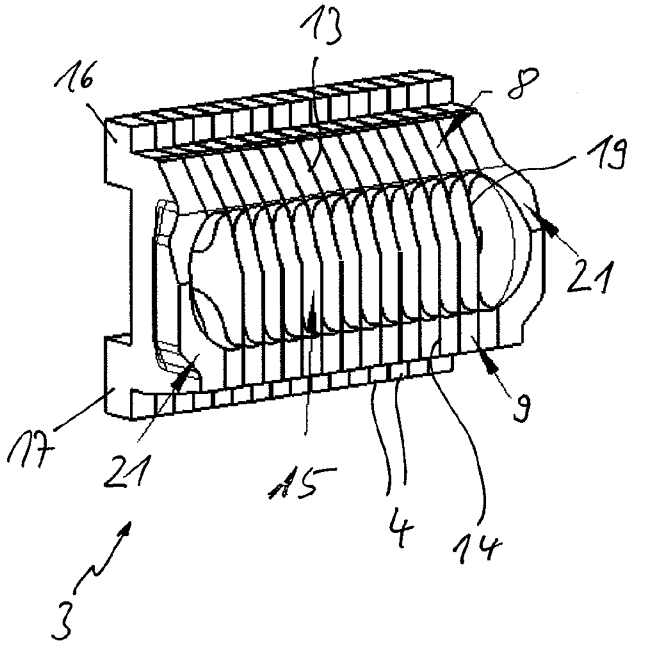
FIG. 2 is a perspective front view of a single-row upstream optical unit.
Figure 3:
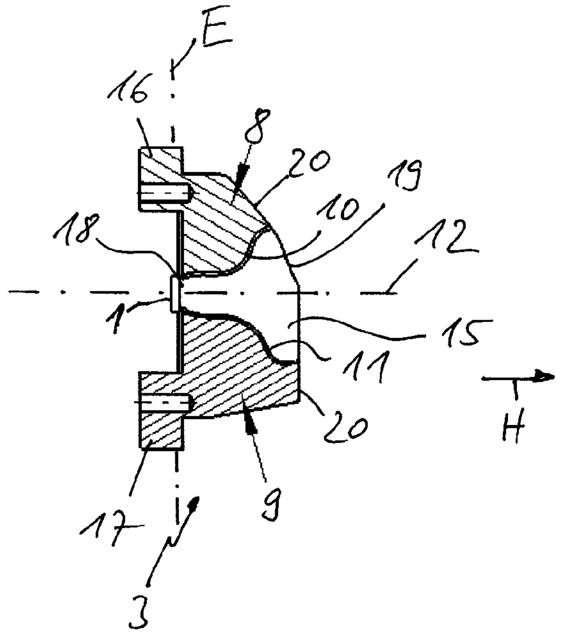
FIG. 3 is a vertical section through an upstream optical element of the upstream optical unit in accordance with FIG. 2.

In an initial embodiment of the invention in accordance with FIGS. 2 and 3, the upstream optical unit 3 has a single-row configuration, i.e. the upstream optical elements 4 are arranged in a single row or in adjacent linear rows, preferably in a horizontal configuration. The upstream optical elements 4 of upstream optical unit 3 each have an upper reflector segment 8 and a lower reflector segment 9. The upper reflector segment 8 and the lower reflector segment 9 each have a curved design. The upper reflector segment 8 and the lower reflector segment 9 each have curved reflective surfaces 10 and 11. The reflective surface 10 of the upper reflector segment 8 and the reflective surface 11 of bottom reflector segment 9 extend from the light source plane E with enlargement of the distance relative to an optical axis 12 in the primary emission direction H. The upper reflector segment 8 and the lower reflector segment 9 extend along both sides of a horizontal plane in which optical axis 12 extends.

The upper reflector segment 8 and the lower reflector segment 9 each have flat sides 13 and 14 that are parallel to each other. Between the upper reflector segments 8 that are adjacent to flat sides 13, 14 and lower reflector segments 9 and adjacent upstream optical elements 4 there is, in part, a separating strip element 15, which forms the boundary between two adjacent upstream optical elements 4. Thus the separating strip element 15 extends in a plane from the upstream optical elements 4 adjacent to flat sides 13, 14.

The upper reflector segment 8 and the lower reflector segment 9, which together form a single upstream optical element 4, are joined together to form a single piece. Thus each upstream optical element 4 is designed in one piece and connected to the adjacent upstream optical element 4 through a frictional connection, substance-to-substance bond or positive fit. For example, adjacent upstream optical elements 4 can be joined by gluing them together. Between the upstream optical elements 4 between the flat sides that face each other 13, 14, the separator strip element 15 can be wedged.

In an alternative embodiment of the invention that is not shown here, the upstream optical elements 4 and the reflector segments 8, 9 can also be fastened to a base plate via their footings 16 and 17. This fastening can take the form of a frictional connection, positive fit or substance-to-substance bond.

Preferably, the upstream optical elements 4 have a detachable connection to each other, allowing the number of upstream optical elements 4 to be reduced later.

The separator strip elements 15 preferably have a flat design and are perpendicular to the light source plane E. A backwards-facing edge 18 of separator strip element 15 extends through light source plane E. A front-side edge 19 of separator strip element 15 is flush with a front side 20 of the upper reflector segment 8 or the lower reflector segment 9. This ensures that light allowed to pass through by an initial upstream optical element 4 hits the primary optical unit 5 as a light distribution segment and is mapped by the same primary optical unit 5 to a light distribution segment that is arranged adjacent to a light distribution segment mapped by the adjacent second upstream optical element 4. The separator strip elements 15 thus enable a delimitation and separation of the light emitted by the different light sources 1. The upper reflector segment 8 and the lower reflector segment 9 ensure that the light transmitted by the respective light sources 1 is directed such that the light distribution segments mapped by the primary optical unit 5 of adjacent upstream optical elements 4 are immediately adjacent in the light distribution.

The separator strip elements 15 are preferably embodied as reflective sheet metal parts so that the light segment bundle reflected by same can be used for the light distribution.

At each opposite end of the upstream optical unit 3, front end reflector segments 21 are provided instead of the separator strip element 15, which is used to preform the light affected by the upstream optical element on the front side 4.

The separator strip element 15 is designed relatively thin compared to a thickness of the reflector segments 8, 9, which is determined by the distance of flat sides 13, 14.

The adjacent upstream optical elements 4 touch each other over their entire surface at flat sides 13, 14 and are preferably connected by joining.

Figure 4:
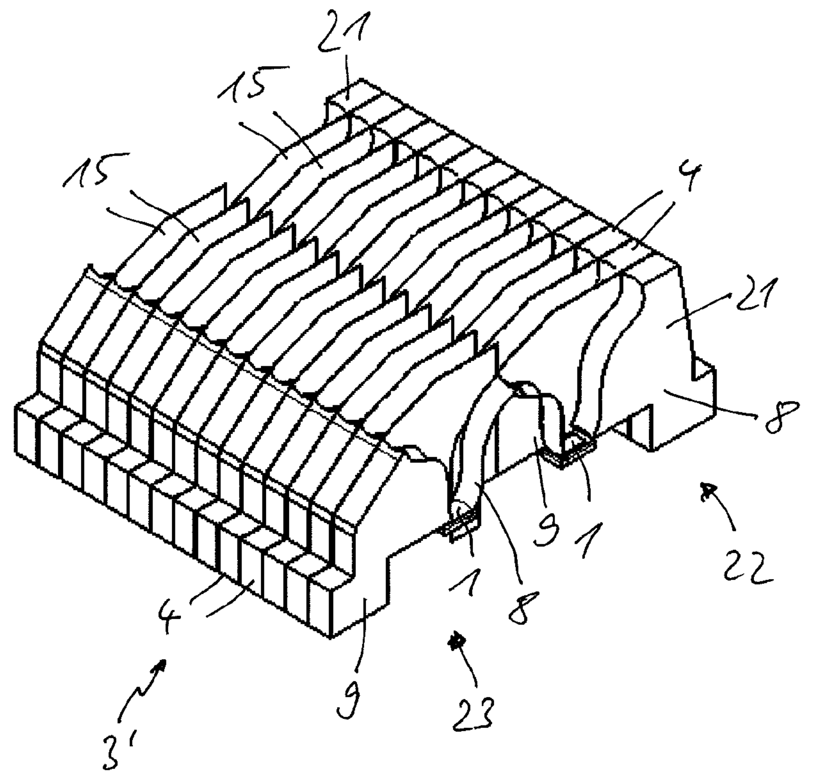
FIG. 4 is a perspective front view of a two-row upstream optical unit.
Figure 5:
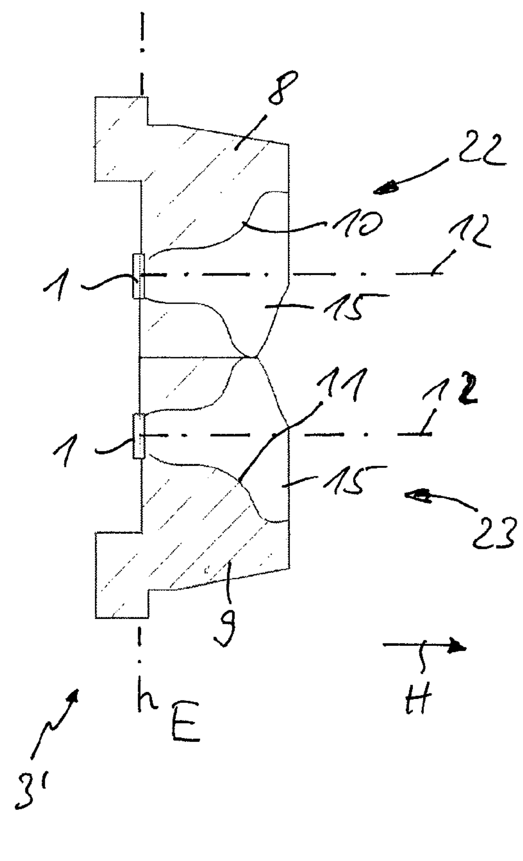
FIG. 5 is a vertical section through an upstream optical element of the two-row upstream optical unit.

Another embodiment of the invention in accordance with FIGS. 4 and 5 also provides for a multi-row upstream optical unit 3', which consists of two rows of upstream optical elements 4. An initial row 22 of upstream optical elements 4 extends above and parallel to a second row 23 of upstream optical elements 4. The upstream optical elements 4 of the first row 22 can, for example, have an identical design to the upstream optical elements 4 of the second row 23. Overall, all upstream optical elements 4 of the first row 22 and the second row 23 can have the same configuration. Overall, only four different reflector segments result, namely an upper reflector segment 8 and a lower reflector segment 9, which are embodied in different shapes, and two differently embodied front end reflector segments 21. Thus the number of component shapes can be kept small.

In an alternative embodiment of the invention, the upstream optical elements 4 and the top and bottom reflector segments 8, 9 of different upstream optical elements 4 can have differently shaped designs, so that the light distribution has a gentle taper towards the side, for example. For this purpose, the front upstream optical elements 4 have a different shape than the inner upstream optical elements 4.

The same components and/or component functions of both design examples have been given the same reference numbers.

In an alternative embodiment of the invention, the upstream optical unit 3, 3' can also have a plurality of identical upstream optical elements 4 and a plurality of different upstream optical elements.

LIST OF REFERENCE SYMBOLS

1 Light source
2 Optical unit
3,3' Upstream optical unit
4 Upstream optical elements
5 Upstream optical unit
6 1st lens
7 2nd lens
8 Upper reflector segment
9 Lower reflector segment
10 Reflective surfaces
11 Reflective surfaces
12 Optical axis
13 Flat sides
14 Flat sides
15 Separator strip element
16 Footings
17 Footings
18 Backward edge
19 Front edge
20 Front side
21 Front end reflector segments
22 1st row
23 2nd row
E Light source plane
H Main direction of emission

The invention claimed is:

1. A lighting apparatus for vehicles comprising:

one or more light sources; and an optical unit for generating a specified light distribution, wherein the optical unit has an upstream optical unit with upstream optical elements, each of which is assigned to a respective of said one or more light sources, the optical elements joining the light sources in the primary direction of emission upstream of said sources, wherein the upstream optical unit has a modular configuration, where the majority of upstream optical elements are configured in selectively connectable segments, wherein the upstream optical elements each have an upper reflector segment and a lower reflector segment, and wherein connected upstream optical elements are separated from each other by a separator strip element.

2. The lighting apparatus in accordance with claim 1, wherein the upstream optical elements have at least one of a substance-to-substance bond, a frictional connection or a positive fit with each other.

3. The lighting apparatus in accordance with claim 1, wherein the upstream optical unit has at least one of a plurality of identical upstream optical elements and a number of different upstream optical elements.

4. The lighting apparatus in accordance with claim 1, wherein the upstream optical elements each have at least one reflector segment with curved reflector surfaces and wherein the upstream optical elements have a detachable connection to each other.

5. The lighting apparatus in accordance with claim 1, wherein the separator strip elements extend perpendicular to a light source level (E) in which the light sources are arranged and wherein a rear-facing edge of the separator strip element extends in the light source level (E) and wherein a front edge of the separator strip element is flush with one front side of the reflector segment.

6. The lighting apparatus in accordance with claim 1, wherein the separator strip elements are each configured as reflecting metal parts.

7. The lighting apparatus in accordance with claim 4, wherein the top reflector segment and the bottom reflector segment are shaped such that the light distribution segments generated by the upstream optical unit arranged in the primary emission direction (H) are mapped by a primary optical unit arranged upstream of the upstream optical unit to light distribution segments that are immediately adjacent in the light distribution.

8. The lighting apparatus in accordance with claim 1, wherein the upstream optical elements are arranged in at least one of a single row and multiple rows.

9. The lighting apparatus in accordance with claim 8, wherein each of the rowed upstream optical elements has a front end reflector segment.

* * * * *